United States Patent
Mori

(10) Patent No.: US 8,616,257 B2
(45) Date of Patent: Dec. 31, 2013

(54) DEVICE FOR PRELIMINARY BONDING OF LAMINATED GLASS

(75) Inventor: Takeshi Mori, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 19 days.

(21) Appl. No.: 13/386,919

(22) PCT Filed: Jul. 26, 2010

(86) PCT No.: PCT/JP2010/062500
§ 371 (c)(1),
(2), (4) Date: Jan. 25, 2012

(87) PCT Pub. No.: WO2011/033859
PCT Pub. Date: Mar. 24, 2011

(65) Prior Publication Data
US 2012/0160422 A1    Jun. 28, 2012

(30) Foreign Application Priority Data

Sep. 16, 2009  (JP) ................................. 2009-214353

(51) Int. Cl.
| | | |
|---|---|---|
| *B29C 65/00* | (2006.01) | |
| *B32B 37/10* | (2006.01) | |
| *B32B 43/00* | (2006.01) | |
| *B30B 3/04* | (2006.01) | |

(52) U.S. Cl.
USPC ....... 156/391; 156/555; 156/582; 100/155 G; 100/158 R; 100/176

(58) Field of Classification Search
USPC .......... 156/391, 555, 582; 100/155 G, 158 R, 100/168, 171, 176
See application file for complete search history.

(56) References Cited

U.S. PATENT DOCUMENTS

| 1,314,300 A | * | 8/1919 | McCaskey ...................... 83/155 |
| 4,327,634 A | * | 5/1982 | Colmon et al. ........... 100/155 G |
| 4,701,240 A | | 10/1987 | Kraemer et al. |
| 4,934,515 A | * | 6/1990 | Linden ....................... 198/803.2 |

FOREIGN PATENT DOCUMENTS

| JP | 47-2265 | | 1/1972 |
| JP | 61-169248 | A | 7/1986 |
| JP | 2-279544 | A | 11/1990 |
| JP | 3-21494 | B2 | 3/1991 |
| JP | 2002-167242 | A | 6/2002 |

OTHER PUBLICATIONS

PCT/ISA/237 Form (Three (3) pages).
International Search Report including English language translation dated Sep. 21, 2010 (Three (3) pages).

* cited by examiner

*Primary Examiner* — Sing P Chan
(74) *Attorney, Agent, or Firm* — Crowell & Moring LLP

(57) ABSTRACT

A device for preliminary bonding superposed curved glass plates together through an interlayer between them by sandwiching and pressing the plates from both outside surfaces of the superposed plates. The device has an upper roll pressing means with plural independent upper rolls arranged in a row along a plate upper surface to press against the upper surface of the plate (G), a lower roll pressing means with plural independent lower rolls arranged in a row along a plate lower surface to press against the lower surface of the plate a curveable lower flexible roll contiguous with the top of each lower roll, and a drive (50) for rotating the lower flexible roll. The curved glass plates are press-bonded together by the upper rolls and the lower flexible roll by the lower roll pressing means pressing the lower flexible roll through the lower rolls against the lower surface of the plate.

7 Claims, 5 Drawing Sheets

DEVICE FOR PRELIMINARY BONDING OF LAMINATED GLASS

TECHNICAL FIELD

The present invention relates to a preliminary bonding device of a laminated glass, which is capable of preventing occurrences of poor bonding and poor sealing of an edge portion of a glass plate by a uniform pressing force when bonding two glasses together through an interlayer in a manufacturing process of the laminated glass used as a window glass of a vehicle.

BACKGROUND ART

In a related art technique, as a best-known and widely used laminated glass among laminated glasses formed by bonding a plurality of superposed glass plates, it could be a laminated glass formed by bonding the glass plates together through an interlayer, which is completed by inserting a resin sheet made of PVB (polyvinyl butyral) as the interlayer between the glass plates and arranging them in layers then heating and pressing these interlayer and glass plates.

In a process in which the glass plates are bonded, if air bubbles remain between the glass plates, even if the air bubbles are minute, not only light transmittance is deteriorated, but this brings about a decrease in adhesive strength of the bonded glass plates, then there arises a problem such as exfoliation. Therefore, it is essential that before a main bonding process in which the glass plates are bonded together by entirely melting an adhesive film by the application of heat under a constant pressurization condition in an autoclave, a preliminary bonding process that sufficiently carries out deaeration or degassing of the air bubbles between the glass plates through heating and pressurization should take place.

In particular, since the window glass of the vehicle has a three-dimensional shape that curves in two directions, in order to degas the air bubbles between the superposed two glass plates, an idea of uniformly pressing the glass plates from both surfaces is required.

For example, Japanese Patent Provisional Publication Tokkaisho No. JP61-169248 discloses a device for joining at least one sheet of glass and at least one film of plastic material by calendering. The device has a series of pressure rollers mounted side-by-side in a flexible manner and a series of counter pressure rollers mounted in a flexible manner and cooperating with the pressure rollers. The pressure rollers and the counter pressure rollers are each mounted at an extremity of a piston rod. The other extremity of the piston rod bears a pressure piston actuated by pneumatic pressure and moving in a pneumatic casing (Patent Document 1).

Further, Japanese Patent Provisional Publication Tokkaihei No. JP2-279544 discloses a preliminary bonding device that performs the preliminary bonding by passing a laminated member for a laminated glass between a plurality of pressurizing rolls which are arranged at upper and lower sides. The preliminary bonding device has a mechanism by which all of the pressurizing rolls can rotate in a surface substantially perpendicular to a passing direction of the laminated member of the laminated glass (Patent Document 2).

Furthermore, in Japanese Patent Provisional Publication Tokkosho No. JP47-2265, for the purpose of rolling out a spherically curved glass plate, which has a synthetic resin film of intermediate insertion, to a pre-complex, a rolling device has a revolution frame that is capable of turning on an axis substantially perpendicular to a rolling direction, and a number of pressure rolls that act on upper and lower glass plates by their respective springs are arranged in the revolution frame. The rolling device allows each pressure roll to be fixed to the revolution frame together with a structure part which supports the pressure roll and is secured to the revolution frame and together with the spring independently of the other pressure rolls. Also each pressure roll is combined with a pressure roll unit that can detach from the revolution frame independently. In addition, the pressure roll unit is secured to the revolution frame so as to be adjusted laterally in the rolling direction for coping with a different curvature of the precomplex (Patent Document 3).

Moreover, Japanese Patent Provisional Publication Tokkohei No. JP3-21494 discloses a curved roll apparatus that has a pair of flexible rolls and a plurality of backup rolls that limit a relative position of each part of the flexible roll. At least a curved portion of each flexible roll is hollow inside, and the flexible roll has therein a spiral member (Patent Document 4).

In addition, Japanese Patent Provisional Publication Tokkai No. JP2002-167242 discloses a preliminary bonding device of a laminated glass which presses a carried-in/out curved laminated glass sandwiching an interlayer from both curved surfaces thereof by a plurality of roll units that are capable of adjustment of angle along a longitudinal cross section shape. The preliminary bonding device has a carrying-in carrying-out means that carries in/out the curved glass with an inclination angle changed and a pressing roll unit formed by an upper side roll unit and a lower side roll unit. The preliminary bonding device also has a roll pressing means having upper and lower pressing rolls disposed so as to pair in a normal direction of the curved glass surface, a pressing cylinder provided for each pressing roll to press the roll against the glass surface and a pressure control valve to keep a pressure in the pressing cylinder constant, an angle adjusting means which supports holding points of the upper and lower pressing cylinders so that positions of the holding points of the cylinders can shift within respective long holes provided in horizontally set upper and lower lateral frames to adjust a pressing angle against the curved glass, a rotating means which forms a rectangular main supporting frame by connecting both ends of the upper and lower lateral frames to longitudinal frames and allows a rotation of the main supporting frame on a supporting axis set at a substantially center part of each longitudinal frame, and a driving means that moves the curved glass between the upper and lower side pressing roll units with its moving speed adjusted. The upper and lower side pressing roll units are set in the normal direction of the curved glass surface in accordance with a carrying-in/out speed of the curved glass (Patent Document 5).

CITATION LIST

Patent Document

Patent Document 1: Japanese Patent Provisional Publication Tokkaisho No. JP61-169248
Patent Document 2: Japanese Patent Provisional Publication Tokkaihei No. JP2-279544
Patent Document 3: Japanese Patent Provisional Publication Tokkosho No. JP47-2265
Patent Document 4: Japanese Patent Provisional Publication Tokkohei No. JP3-21494
Patent Document 5: Japanese Patent Provisional Publication Tokkai No. JP2002-167242

SUMMARY OF THE INVENTION

Technical Problem

In the Patent Document 1, the series of pressure rollers and the series of counter pressure rollers are each arranged so as to press the glass sheet and the film with a normal direction of a curved glass surface being a pressing axis. However, both pressing axes of the upper side pressure roller and the lower side counter pressure roller are not aligned with each other, and these pressing axes widely shift to each other at an edge portion of a width direction orthogonal to a carrying-in/out direction. Therefore, in a case of a curved glass having a small curvature at both edge sides in the width direction which is required to be curved deeply, since the upper side pressure rollers and the lower side counter pressure rollers, which press the both edge sides of the curved glass, are arranged in a staggered configuration, a uniform pressing force cannot be obtained at the glass surfaces around both edge sides. As a result, the degassing of the air bubbles between the glass plates is inadequate and the air bubbles tend to remain between the two glass plates, then there is a problem that an adhesive portion is prone to exfoliate.

In the invention described in the Patent Document 2, the plurality of pair of pressurizing rolls arranged in a row are driven and rotate independently, and by passing the laminated member of the laminated glass between the pressurizing rolls from one end of the laminated member, the degassing is performed so that an inside air between the glass plates is extracted or squeezed. However, in a case where an edge portion in a width direction of the glass plate passing between the upper and lower side pressurizing rolls comes to a gap position of the plurality of the pressurizing rolls arranged in the width direction in a row, the pressure of the edge portion is not sufficient, then a problem that gives rise to an insufficiency of the degassing might arise.

Further, in the invention described in the Patent Document 3, if a stroke of each of the pressure rolls provided at upper and lower sides is broadened for coping with a variety of curvatures of the curved glass plate, because the pressure roll is forced by only elastic force of the spring, the rolling device has no other choice but to use a strong spring. The pressing force varies according to degree of expansion/contraction with variation of a curved shape of the glass. Thus the upper and lower pressure rolls do not smoothly move, and the following of the pressure roll to the curved shape of the curved glass becomes worse. For this reason, excessive force is applied to the glass plate, and this causes a problem that the glass plate is easily broken.

Furthermore, in the invention described in the Patent Document 4, the pair of rubber hollow rolls are curved into a curved shape by a plurality of holding rolls, and by connecting an end portion of the rubber roll to a driving motor then driving the rubber roll, the glass plates having therebetween a film pass between these rubber rolls from one end of the glass plates, and an inside air between the glass plates is extracted or squeezed. However, since degree of curvature of the flexible rubber hollow roll depends on the relative position of the holding rolls that are set externally, it takes a long time to adjust the curvature, and there is a problem about reproducibility of the curved shape. In addition, since the holding rolls exist in part, according to the presence or absence of the holding roll, a pressure applied to the glass plate is partly different, and this brings about a problem that an entire surface of the glass cannot be uniformly degassed.

In addition, in the invention described in the Patent Document 5, a distance or space between the adjacent pressing rolls that press the curved glass surface of a curved glass convex surface side becomes large, then variation in pressing force which the glass surface receives occurs between an area where the pressing roll touches and presses the glass surface and a gap portion where the pressing roll does not touch the glass surface. The degassing of the air bubbles between the two glass plates is therefore inadequate and the air bubbles tend to remain between the two glass plates especially at an area around an edge of the glass plate. As a consequence, unevenness in bonding occurs, then there is a problem that an adhesive portion is prone to exfoliate.

Solution to Problem

The present invention is the one that solves the above problems, and its object is to provide a preliminary bonding device of the laminated glass which, when pressing and bonding a plurality of superposed glass plates having therebetween an interlayer such as PVB (polyvinyl butyral) from both outside surfaces of the superposed glass plates by pressing upper and lower rolls while carrying in/out the glass plates, can press the glass plates from the both outside surfaces of the superposed curved glass plates by a uniform pressing force throughout a width direction of the glass plates which is orthogonal to a carrying-in/out direction of the glass plates without unevenness in the pressing. Also the object is to prevent occurrences of poor bonding and poor sealing of an edge portion of the glass plates caused by the unevenness in the pressing especially at an area around the edge portion of the glass plates.

That is, in the present invention, a preliminary bonding device of a laminated glass, which bonds superposed curved glass plates together through an interlayer that is sandwiched between the glass plates by sandwiching and pressing the glass plates from both outside surfaces of the superposed curved glass plates, the preliminary bonding device has: an upper roll pressing means having a plurality of independent upper rolls that are arranged in a row along an upper surface of the curved glass plate and pressing the curved glass plate by the each upper roll from an upper surface side of the curved glass plate; a lower roll pressing means having a plurality of independent lower rolls that are arranged in a row along a lower surface of the curved glass plate and pressing the curved glass plate through the lower rolls from a lower surface side of the curved glass plate; a lower side flexible roll that is contiguous with each top end of the plurality of lower rolls and is able to curve; and a lower side roll driving means that drives a rotation of the lower side flexible roll, and the curved glass plates are press-bonded together by the upper rolls and the lower side flexible roll by pressing the lower side flexible roll against the lower surface of the curved glass plate through the lower rolls by the lower roll pressing means.

Or, in the present invention, the preliminary bonding device further has an upper side flexible roll provided between the plurality of upper rolls and the curved glass plate so that the upper side flexible roll is contiguous with each bottom end of the plurality of upper rolls, and the upper side flexible roll is pressed against the upper surface of the curved glass plate through the upper rolls by the upper roll pressing means.

Or, in the present invention, the preliminary bonding device further has an upper side roll driving means that drives a rotation of the upper side flexible roll.

Or, in the present invention, the flexible roll is configured by fitting a plurality of elastic ring members onto a core member that is formed by series connection of a plurality of solid members by universal joint, and has flexibility in up-and-down and left-and-right directions.

Or, in the present invention, the elastic ring members that are an outer periphery portion of the flexible roll are configured so that a concave portion and a convex portion of the adjacent elastic ring members are fitted to each other to reduce a slit between the adjacent elastic ring members when the flexible roll is curved.

Or, in the present invention, the preliminary bonding device further has a turning means that turns a supporting frame that supports the upper rolls or the upper side flexible roll and the lower side flexible roll when passing the superposed curved glass plate between the upper rolls or the upper side flexible roll and the lower side flexible roll, and the turning means turns the supporting frame in accordance with the passing of the superposed curved glass plate so that an imaginary line connecting rotation centers of the upper roll and the lower roll is a normal of the curved glass plate surface at a fulcrum point of the plate surface with an intersection point of the imaginary line and the superposed curved glass plate being the fulcrum then the supporting frame agrees with the imaginary line.

Effects of Invention

When pressing and bonding the plurality of superposed glass plates having therebetween the interlayer such as PVB (polyvinyl butyral) from both outside surfaces of the superposed glass plates by pressing the upper and lower rolls while carrying in/out the glass plates, it is possible to press the glass plates from the both outside surfaces of the superposed curved glass plates by a uniform pressing force throughout a width direction of the glass plates which is orthogonal to a carrying-in/out direction of the glass plates. Further, it is possible to prevent occurrences of poor bonding and poor sealing of an edge portion of the glass plates caused by unevenness in the pressing especially at an area around the edge portion of the glass plates, also to prevent air bubbles from remaining between the glass plates. An occurrence of breakage of the glass plates due to the pressing can also be prevented.

In particular, since the flexible roll having the solid core member is provided between the lower rolls and the glass plate, even if there is a gap or space between the adjacent lower rolls, the pressing force acting on the lower surface side of the glass plate spreads out by the flexible roll without the unevenness in the pressing. The uniform pressing force applied to the glass plate can therefore be obtained.

EMBODIMENTS FOR CARRYING OUT THE INVENTION

The present invention will be explained in detail below with reference to the drawings.

Figure 1:
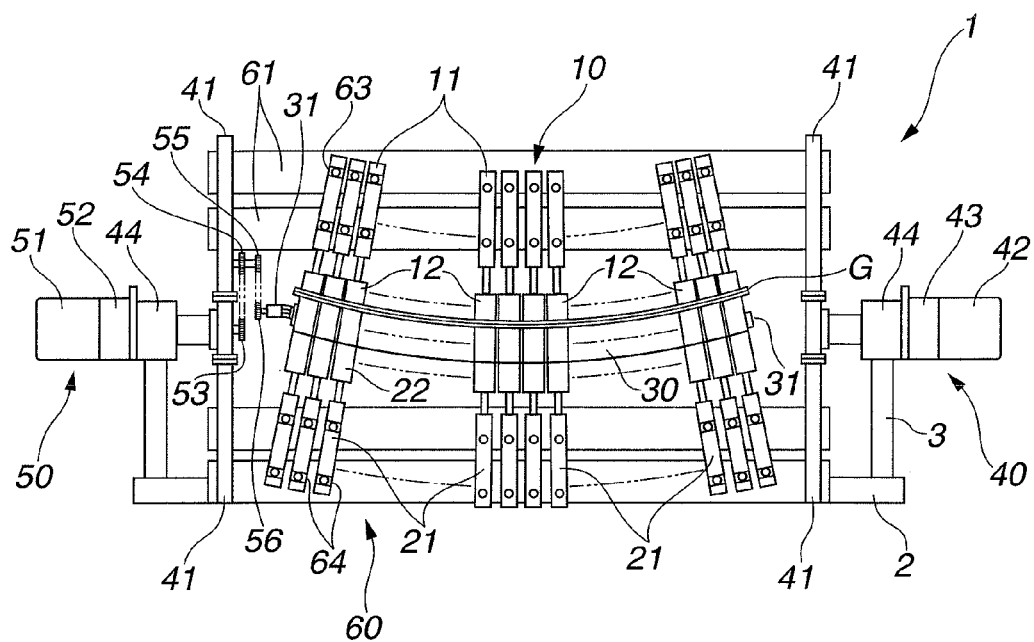
FIG. 1 is a general front view of a preliminary bonding device of an embodiment 1 of the present invention.
Figure 2:
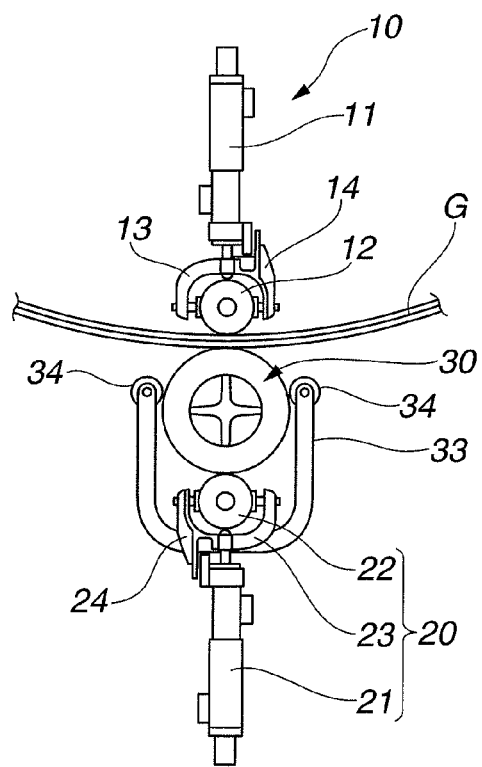
FIG. 2 is a side view of apart of the preliminary bonding device of the embodiment 1 of the present invention.

As shown in FIGS. 1 and 2, a preliminary bonding device 1 of the present invention has an upper roll pressing means 10 having a plurality of independent upper rolls 12, 12 . . . that are arranged in a row along an upper surface of a curved glass plate G and pressing the curved glass plate G by each upper roll 12 from an upper surface side of the curved glass plate G, a lower roll pressing means 20 having a plurality of independent lower rolls 22, 22 . . . that are arranged in a row along a lower surface of the curved glass plate G and pressing the curved glass plate G through the lower rolls 22 from a lower surface side of the curved glass plate G, a lower side flexible roll 30 that is contiguous with each top end of the plurality of lower rolls 22 and is able to bend or curve, and a lower side roll driving means 50 that drives a rotation of the lower side flexible roll 30.

With regard to the upper roll pressing means 10, an upper roll supporting metal 13 is provided at a top end of each rod of a plurality of upper cylinders 11, 11 . . . that are arranged in a row in a width direction which is orthogonal to a carrying-in/out direction of the carried-in/out curved glass plate G. Each upper roll 12 is supported by the upper roll supporting metal 13 so as to freely rotate. Further, the upper cylinder 11 is provided with a holding member (not shown), and a rotation stopper concave groove is formed longitudinally in the holding member. A rotation stopper member 14 is slidably set in the concave groove. Then, each upper roll supporting metal 13 and each upper roll 12 supported by the upper roll supporting metal 13 are set so as not to rotate on a pressing axis of the upper cylinder 11.

As for the lower roll pressing means 20, as same as the upper roll pressing means 10, a lower roll supporting metal 23 is provided at a top end of each rod of a plurality of lower cylinders 21, 21 . . . that are arranged in a row in the width direction orthogonal to the carrying-in/out direction of the carried-in/out curved glass plate G. Each lower roll 22 is supported by the lower roll supporting metal 23 so as to freely rotate. Further, the lower cylinder 21 is provided with a holding member (not shown), and a rotation stopper concave groove is formed longitudinally in the holding member. A rotation stopper member 24 is slidably set in the concave groove. Then, each lower roll supporting metal 23 and each lower roll 22 supported by the lower roll supporting metal 23 are set so as not to rotate on a pressing axis of the lower cylinder 21.

Figure 5:
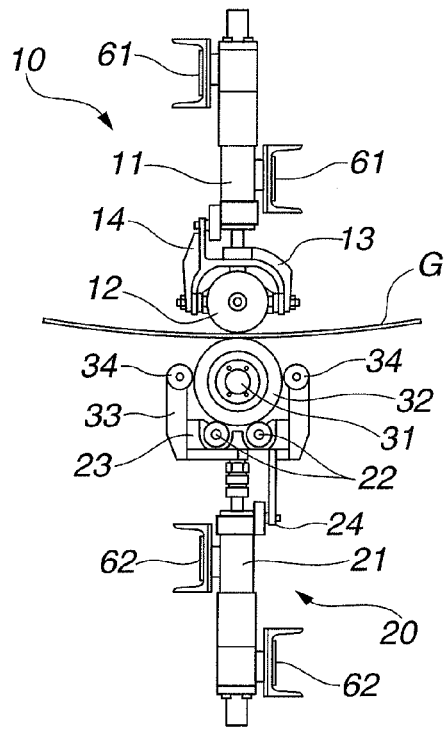
FIG. 5 is a side view of a part of a preliminary bonding device of an embodiment 3 of the present invention.

Here, the lower roll pressing means 20 could be configured so that, as shown in FIG. 5, two lower rolls 22, 22 are supported by the lower roll supporting metal 23 so as to freely rotate then the lower side flexible roll 30 is supported by the fact that the two lower rolls 22, 22 are contiguous with the lower side flexible roll 30.

Each of the upper roll 12 and the lower roll 22 has such sandwich shape that two disk-shaped rolls are coupled together. That is, each of the upper roll 12 and the lower roll 22 has two right and left separated roll parts and a bearing part that is sandwiched between the two roll, parts. As a material of the roll part, an outer periphery portion of the upper roll 12 is made of elastic material, and an outer periphery portion of the lower roll 22 is made of rigid resin. Each roll part can freely rotate.

The lower side flexible roll 30 is one curved roll-shaped member, and is set between each top end of the plurality of lower rolls 22 and the lower surface of the curved glass plate G. A plurality of bending rod members 31 as a solid core member are connected together by universal joint, then the lower side flexible roll 30 has flexibility. The lower side flexible roll 30 is supported by the fact that supporting rolls 34, 34 . . . of a plurality of flexible roll supporting metals 33, 33 . . . are contiguous with the lower side flexible roll 30. Each of the flexible roll supporting metals 33 is secured to the lower roll supporting metal 23. A position of the lower side flexible roll 30 is restrained to a desired position by the supporting roll 34 that is provided at each top end portion of the flexible roll supporting metals 33, 33 and freely rotates and the lower roll 22.

Each of the flexible roll supporting metals 33, 33 . . . has such structure that the flexible roll supporting metal 33 points in a constant direction all the time and does not rotate. When each position of the plurality of lower rolls 22, 22 . . . changes, a position of the flexible roll supporting metal 33 follows this change, then a curve level changes.

The lower side flexible roll 30 is pressed against the lower surface side of the glass plate G through the lower rolls 22, 22 . . . by the lower roll pressing means 20, then the superposed curved glass plate G can be pressed and bonded by the pressing from both sides of the lower side flexible roll 30 and the upper rolls 12, 12 . . . .

Figure 7A:
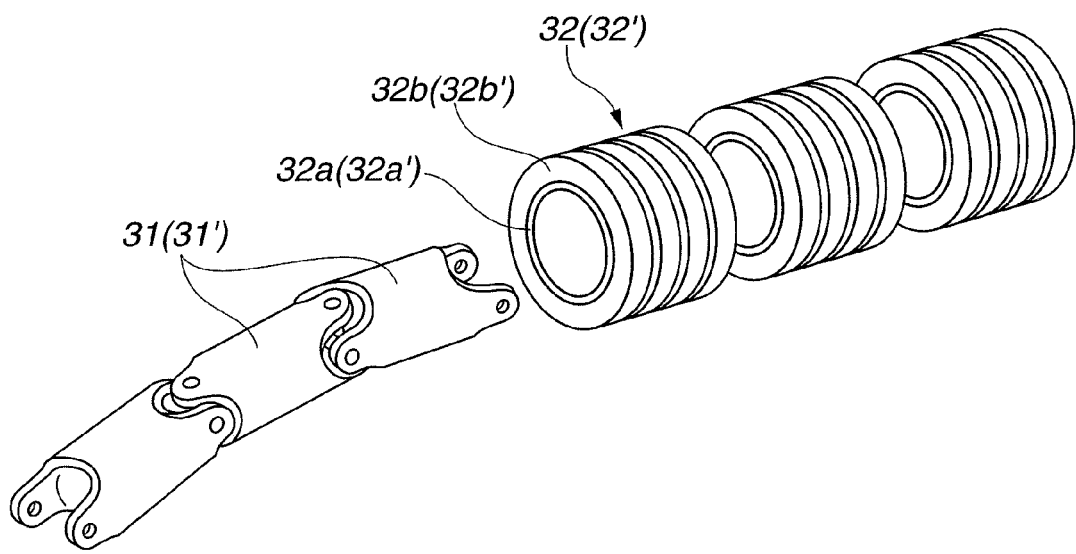
FIG. 7A is a perspective view for explaining a structure of a flexible roll used in the present invention.
Figure 7B:
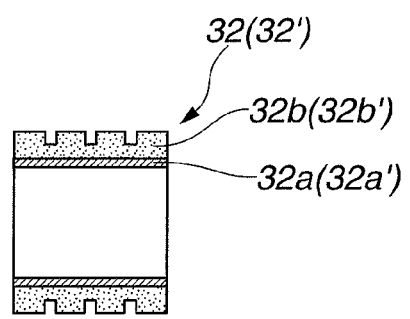
FIG. 7B is a sectional view for explaining a structure of the flexible roll used in the present invention.
Figure 8:
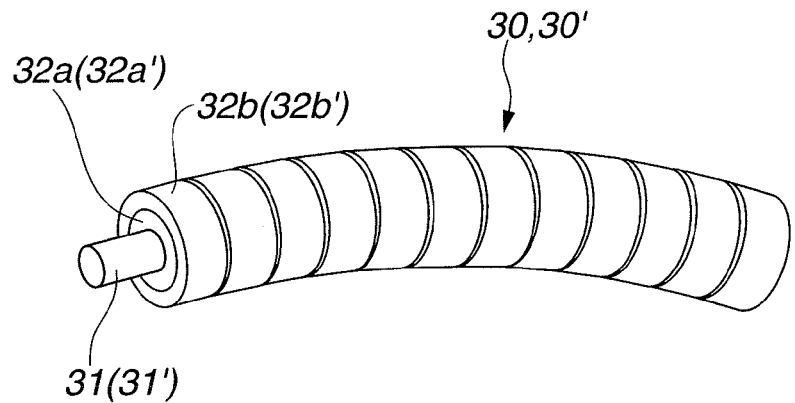
FIG. 8 is a perspective view of the flexible roll used in the present invention.

The flexible roll 30 has a structure as shown in FIGS. 7A and 7B. Each of tubular elastic members 32b, 32b' that is made of rigid resin is bonded to each outer circumferential surface of tubular members 32a, 32a' that is made of solid metal. These bonded tubular members 32a, 32a' and tubular elastic members 32b, 32b' are connected to other bonded tubular members 32a, 32a' and tubular elastic members 32b, 32b' by the universal joint by which both ends of the bending rod members 31, 31' can bend or curve in up-and-down and left-and-right directions. Then each of the flexible rolls 30, 30' has one rod-shape and has such flexibility that the flexible rolls 30, 30' can bend or curve within a movable range of the universal joint as shown in FIG. 8.

Each of elastic ring members 32, 32' is secured to each outer periphery portion of the bending rod members 31, 31' of the flexible rolls 30, 30' by a fixing member (not shown).

As shown in FIG. 7B, a plurality of recessed grooves are formed on each outer circumferential surface of the elastic ring members 32, 32'. By providing this recessed groove, a pressing force of the flexible rolls 30, 30', which is applied to the glass plate surface, can be uniform. It is therefore preferable to provide the recessed groove.

As shown in FIG. 1, the lower side roll driving means 50 rotates the lower side flexible roll 30 through pulleys 53, 54, 55, 56 by drive of a drive motor 51 with rotation of the drive motor 51 decelerated by a speed changer 52. The superposed glass plate G can be then carried in/out.

Figure 3:
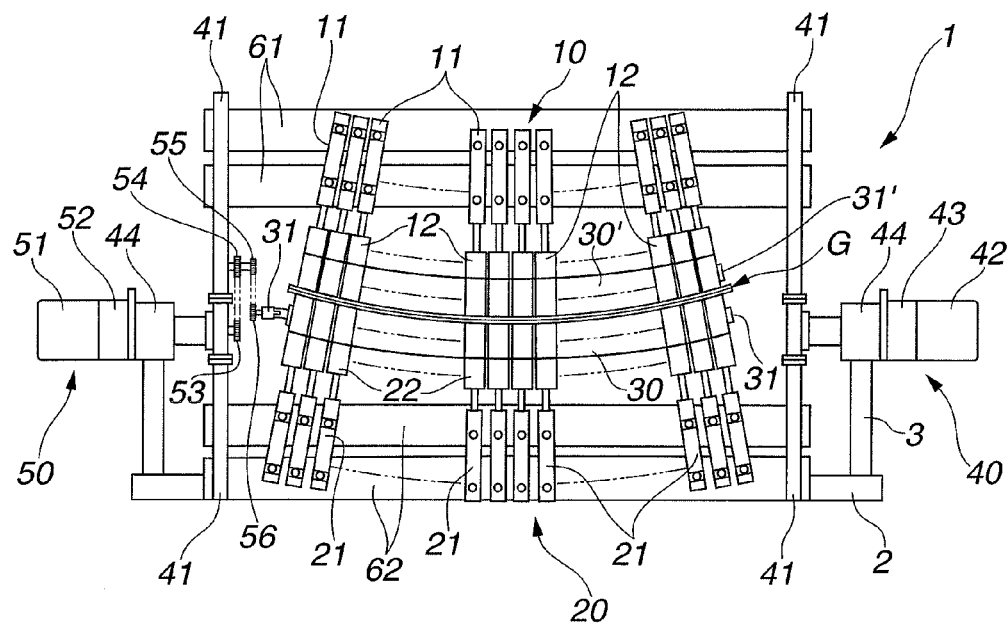
FIG. 3 is a general front view of a preliminary bonding device of an embodiment 2 of the present invention.
Figure 4:
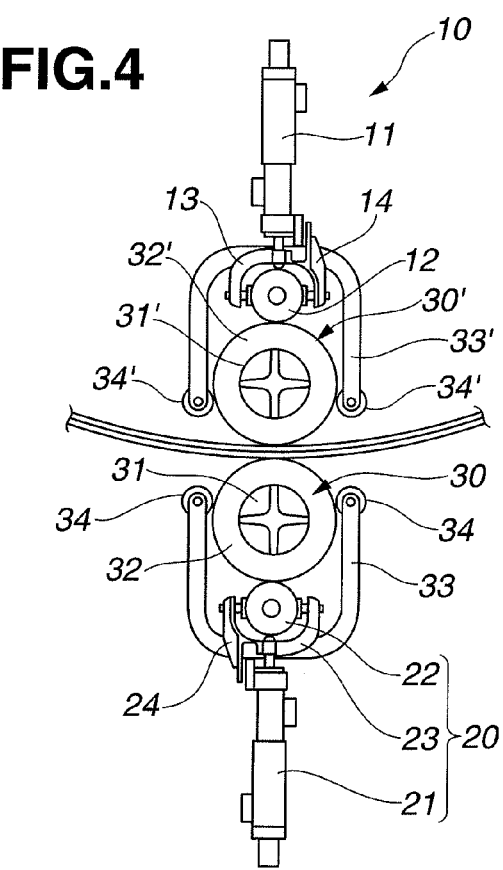
FIG. 4 is a side view of apart of the preliminary bonding device of the embodiment 2 of the present invention.

Further, as shown in FIGS. 3 and 4, as same as the lower side flexible roll 30, an upper side flexible roll 30' could be provided between the plurality of upper rolls 12, 12 . . . and the curved glass plate G so that the upper side flexible roll 30' is contiguous with each bottom end of the plurality of upper rolls 12, 12 . . . .

The upper side flexible roll 30' has no driving source, but freely rotates by following a movement of the glass plate G carried in/out by only the driving of the lower side flexible roll 30. However, not only the lower side flexible roll 30 is driven, but also the upper side flexible roll 30' could be driven. By both drive, even if a load of the superposed glass plate G is heavy, the glass plate G can be carried in/out without laboring.

Each of upper side flexible roll supporting metals 33', 33' . . . is secured to the upper roll supporting metal 13. A position of the upper side flexible roll 30' is restrained to a constant or certain position by supporting rolls 34', 34' that are provided at each top end portion of the upper side flexible roll supporting metals 33', 33' . . . and freely rotate and the upper roll 12.

Figure 6:
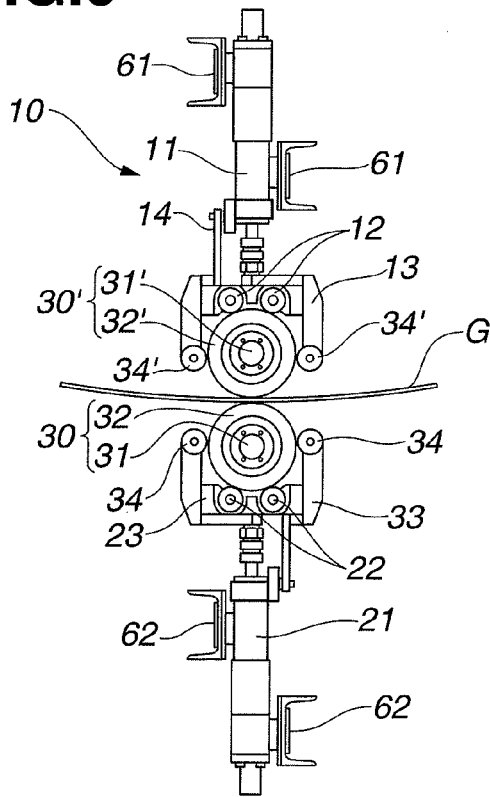
FIG. 6 is a side view of a part of a preliminary bonding device of an embodiment 4 of the present invention.

Here, in the case where the upper side flexible roll 30' is provided between the upper roll 12 and the glass plate G, the upper roll pressing means 10 could be configured so that, as shown in FIG. 6, two upper rolls 12, 12 are supported by the upper roll supporting metal 13 so as to freely rotate then the upper side flexible roll 30' is supported by the fact that the two upper rolls 12, 12 are contiguous with the upper side flexible roll 30'.

With respect to both pressing toward the upper surface side of the glass plate G through the upper rolls 12, 12 . . . by the upper roll pressing means 10 and toward the lower surface side of the glass plate G through the lower rolls 22, 22 . . . by the lower roll pressing means 20, they are simultaneously performed at the upper and lower sides.

Figure 9:
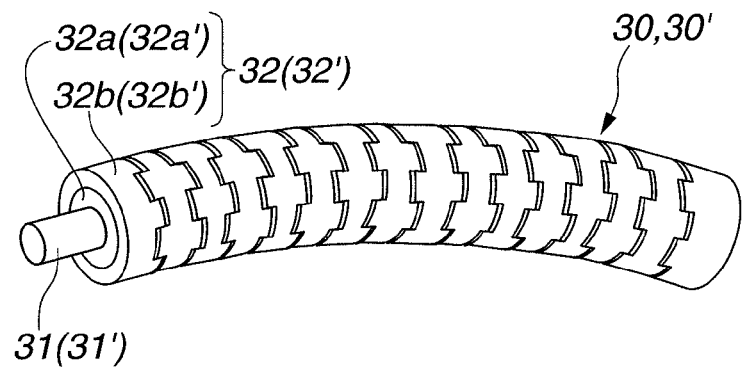
FIG. 9 is a perspective view of another flexible roll used in the present invention.

Here, as shown in FIG. 9, as another embodiment of the flexible rolls 30, 30', regarding the elastic ring members 32, 32' formed by the bonding on the outer circumferential surface of each tubular member 32a, 32a', when the elastic ring members 32, 32' are configured so that a concave portion and a convex portion of the adjacent elastic ring members fill a gap of the concave portion by fitting of the concave and convex portions, even if there appears a slit between the adjacent elastic ring members in a state in which the flexible rolls 30, 30' are curved, the slit is not a linear slit but a concave-convex zigzag slit. Therefore, unevenness in the pressing due to the slit can be reduced when pressing the flexible rolls 30, 30' against the glass plate surface.

In addition, it is preferable that each of the plurality of independent upper rolls 12, 12 . . . and lower rolls 22, 22 . . . be set so as to press the respective surface sides of the glass plate G toward a normal direction of the surface where the flexible rolls 30, 30' are contiguous with the glass plate G.

Figure 10:
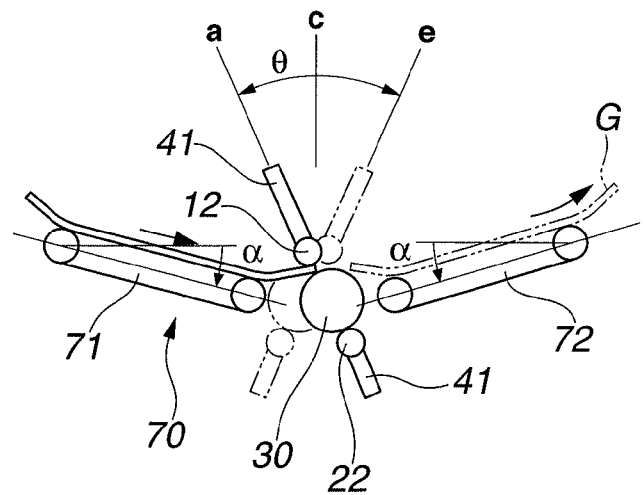
FIG. 10 is a perspective view for explaining a turning means of the preliminary bonding device of the present invention.

Further, as shown in FIG. 10, the preliminary bonding device 1 is provided with a turning means 40 for turning a supporting frame that supports the upper rolls 12, 12 . . . or the upper side flexible roll 30' and the lower side flexible roll 30 when passing the superposed glass plate G between the upper rolls 12, 12 . . . or the upper side flexible roll 30' and the lower side flexible roll 30. The turning means 40 turns the supporting frame in accordance with the passing of the superposed curved glass plate G so that an imaginary line connecting rotation centers of the upper roll 12 and the lower roll 22 is the normal of the curved glass plate surface at a fulcrum point of the plate surface with an intersection point of the imaginary line and the superposed glass plate G being the fulcrum then the supporting frame agrees with the imaginary line.

Regarding the supporting frame turning means 40, as shown in FIGS. 1 and 10, the upper cylinders 11, 11 . . . are secured to upper lateral frames 61, 61, and the lower cylinders 21, 21 . . . are secured to lower lateral frames 62, 62. Both ends of each of the upper and lower lateral frames 61, 61 and 62, 62 are fixed to longitudinal frames 41, 41, thereby forming the supporting frame. The turning means 40 turns the supporting frame with rods that extend horizontally in both outward directions from middle portions of the longitudinal frames 41, 41 being a turning axis.

The rods are rotatably supported by turning bearings 44, 44 provided at top ends of struts 3, 3 that extend from both ends of stage 2 whose base is framed. The rods are driven by a turning motor 42 through a speed changer 43.

As shown by a turning angle range in FIG. 10, the longitudinal frame 41 turns within an angle θ from a position a to a position e with the movement of the curved glass plate G from a top part to an end part of the curved glass plate G.

Next, as shown in FIG. 1, the preliminary bonding device 1 is provided with an angle adjusting means 60 that has fixing holes of long holes 63, 63 . . . and fixing holes of long holes 64, 64 . . . formed in the upper lateral frame 61 and the lower lateral frame 62 for fixing and supporting the upper cylinders 11, 11 . . . and the lower cylinders 21, 21 . . . respectively. The angle adjusting means 60 can adjust fixing positions of the upper and lower cylinders 11 and 21 within a range of the respective long holes 63, 64 so that each pressing direction, toward the glass surface, of the upper rolls 12, 12 . . . of the upper roll pressing means 10 and the lower rolls 22, 22 . . . of the lower roll pressing means 20 is set to be the normal direction of each pressing surface of the curved surface of the glass plate G and also pressing axes of the opposing upper and lower pressing rolls are the substantially same as each other.

Further, as a carrying-in carrying-out means 70, as shown in FIG. 10, a carrying-in conveyor 71 that allows adjustment of an inclination angle α of the conveyor from a horizontal direction to a lower direction, also a carrying-out conveyor 72 that allows adjustment of an inclination angle α of the conveyor, are provided in rear and front positions of the turnable longitudinal frame 41 that supports the upper roll pressing means 10, the lower roll pressing means 20, the flexible rolls 30, 30' and the angle adjusting means 60 etc. The carrying-in carrying-out means 70 adjusts each inclination angle α of the conveyors so that an incoming top end portion of the superposed curved glass plate G and an outgoing rear end portion of the superposed curved glass plate G come to a gap position between the upper roll of the upper roll pressing means 10 and the lower side flexible roll 30, when changing a tooling setup.

The inclination angles α of the carrying-in conveyor 71 and the carrying-out conveyor 72 are not necessarily the same depending on a curved shape of the superposed curved glass plate G. In this case, the inclination angles of the carrying-in side and the carrying-out side can be each adjusted to a desired angle.

Next, operation and working of the preliminary bonding device of the present invention will be explained.

In comparison with the related art technique in which the curved glass plate is pressed and bonded by the plurality of upper rolls and the plurality of lower rolls respectively arranged in a row, in the present invention, the flexible roll 30 whose surface is made of elastic rubber is provided between a convex shaped surface, i.e. the lower side surface of the curved glass plate G and the top end portions of the lower rolls 22. Thus the pressing force, toward the lower surface side of the curved glass plate G, of the lower rolls 22 by the lower roll pressing means 20 is applied to the lower surface side of the curved glass plate G through the lower side flexible roll 30, thereby giving the uniform pressing force to the lower surface of the curved glass plate G without a gap on a contact surface of the curved glass plate G.

Further, as another embodiment of the flexible rolls 30, 30', since the elastic ring members 32, 32' are configured so that the concave portion and the convex portion of the adjacent elastic ring members fill the gap of the concave portion by fitting of the concave and convex portions, not all the concave-convex slit between the adjacent elastic ring members 32 and 32, 32' and 32' agree with a linear edge line of the glass plate G, thereby reducing the unevenness in the pressing due to the slit when pressing the flexible rolls 30, 30' against the glass plate surface.

Furthermore, In the case where the press-bonding of the curved glass plate G is performed between the upper rolls 12, 12 . . . and the lower side flexible roll 30 of the preliminary bonding device 1 while carrying in/out the glass plate G, as shown in FIG. 10, when the curved glass plate G moves downward on the inclined carrying-in conveyor 71 with the upper surface side of the glass plate G being a concave shaped surface, the longitudinal frame 41 stands by at the position a. At this time, each angle θ of the carrying-in conveyor 71 and the carrying-out conveyor 72 is previously set so that an incoming top end surface of the curved glass plate G and the axis of the longitudinal frame 41 are orthogonal to each other.

The longitudinal frame 41 turns within the angle θ from the position a to the position e shown in FIG. 10 in accordance with the movement of the superposed curved glass plate G carried in/out by the lower side flexible roll 30 driven by the lower side roll driving means 50.

At a time when the longitudinal frame 41 reaches the position e, an outgoing rear end surface of the curved glass plate G and the axis of the longitudinal frame 41 are orthogonal to each other, then the superposed curved glass plate G is moved onto the inclined carrying-out conveyor 72.

Here, although the longitudinal frame 41 turns from the position a to the position e at a predetermined speed, the superposed curved glass plate G is carried in/out with its speed varied during the passing of the glass plate G. That is, the lower side flexible roll 30 is driven so that only an area of a part of the top end portion and the rear end portion of the superposed curved glass plate G moves at low speed and a middle area of the glass plate G passes at high speed. The carrying-in conveyor 71 and the carrying-out conveyor 72 are configured to synchronize with these speed.

The inclination angle α of the carrying-in conveyor 71 and the carrying-out conveyor 72 as shown in FIG. 10 is set in accordance with the curved shape when changing the tooling setup, then is adjusted so that the incoming top end surface of the curved glass plate G and the axis of the longitudinal frame 41 are orthogonal to each other.

As shown in FIG. 1, it is preferable that each of the upper pressing rolls 12, 12 . . . and each of the lower pressing rolls 22, 22 . . . be arranged so that, at the tooling setup, pressing axes of the opposing pair of upper and lower cylinders 11, 11 . . . and 21, 21 . . . agree with each other and also a direction of the pressing axis is set to the normal direction of the contact surface of the middle area of the curved glass plate G with the upper and lower pressing rolls 12, 22 through the lower side flexible roll 30. However, in the case where the flexible roll 30 or 30' is provided, since the pressing force can be uniformly obtained by the flexible roll at a side where the flexible roll is contiguous with the pressing roll, even if the pressing axis shifts, the press-bonding is performed without problem.

That is, the upper and lower cylinders 11, 11 . . . and 21, 21 . . . are set so that the pressing axes of the opposing pair of upper and lower cylinders 11 and 21 agree with each other within the range of the respective long holes 63, 64 of the upper lateral frame 61 and the lower lateral frame 62 for fixing the upper cylinders 11, 11 . . . and the lower cylinders 21, 21 . . . . In addition, the upper and lower cylinders 11, 21 are fixed to the upper lateral frame 61 and the lower lateral frame 62 respectively so that the direction of each of the pressing axes is the normal direction of the curved surface of the glass plate G.

A line connecting each upper roll 12 and a contact point between each upper roll 12 and the surface of the glass plate G becomes an arc which corresponds to the shape of the curved glass plate G at the tooling setup. However, in fact, there is a slight step between the adjacent pressing rolls, and it is a concave-convex shape like a sawtooth. For this concave-convex shaped step, a spring (not shown) whose elastic modulus is low is provided inside the upper and lower cylinders 11, 21 to absorb the step.

Explanation Of Reference Sign

G glass plate
1 preliminary bonding device
2 stage
3 strut
10 upper roll pressing means
11 upper cylinder
12 upper roll
13 upper roll supporting metal
14 rotation stopper member
20 lower roll pressing means
21 lower cylinder
22 lower roll
23 lower roll supporting metal
24 rotation stopper member
30, 30' flexible roll
31, 31' bending rod member
32, 32' elastic ring member
32a, 32a' tubular member
32b, 32b' tubular elastic member
33, 33' flexible roll supporting metal
33a, 33a' supporting roller
34, 34' supporting roll
40 turning means
41 longitudinal frame
42 turning motor
43 speed changer
44 turning bearing
50 roll driving means
51 drive motor
52 speed changer
53~56 pulley
57, 58 belt
59 drive shaft
60 angle adjusting means
61 upper lateral frame
62 lower lateral frame
63, 64 long hole
70 carrying-in carrying-out means
71 carrying-in conveyor
72 carrying-out conveyor

The invention claimed is:

1. A preliminary bonding device of a laminated glass, which bonds superposed curved glass plates together through an interlayer that is sandwiched between the glass plates by sandwiching and pressing the glass plates from both outside surfaces of the superposed curved glass plates, the preliminary bonding device comprising:
an upper roll pressing means having a plurality of independent upper rolls that are arranged in a row along an upper surface of the curved glass plate and pressing the curved glass plate by the each upper roll from an upper surface side of the curved glass plate;
a lower roll pressing means having a plurality of independent lower rolls that are arranged in a row along a lower surface of the curved glass plate and pressing the curved glass plate through the lower rolls from a lower surface side of the curved glass plate;
a lower side flexible roll that is contiguous with each top end of the plurality of lower rolls and is able to curve; and
a lower side roll driving means that drives a rotation of the lower side flexible roll, and
the curved glass plates being press-bonded together by the upper rolls and the lower side flexible roll by pressing the lower side flexible roll against the lower surface of the curved glass plate through the lower rolls by the lower roll pressing means.

2. The preliminary bonding device of the laminated glass as claimed in claim 1, further comprising:
an upper side flexible roll provided between the plurality of upper rolls and the curved glass plate so that the upper side flexible roll is contiguous with each bottom end of the plurality of upper rolls, and
the upper side flexible roll being pressed against the upper surface of the curved glass plate through the upper rolls by the upper roll pressing means.

3. The preliminary bonding device of the laminated glass as claimed in claim 2, further comprising:
an upper side roll driving means that drives a rotation of the upper side flexible roll.

4. The preliminary bonding device of the laminated glass as claimed in claim 2, wherein:
the flexible roll is configured by fitting a plurality of elastic ring members onto a core member that is formed by series connection of a plurality of solid members by universal joint, and has flexibility in up-and-down and left-and-right directions.

5. The preliminary bonding device of the laminated glass as claimed in claim 4, wherein:
the elastic ring members that are an outer periphery portion of the flexible roll are configured so that a concave portion and a convex portion of the adjacent elastic ring members are fitted to each other to reduce a slit between the adjacent elastic ring members when the flexible roll is curved.

6. The preliminary bonding device of the laminated glass as claimed in claim 2, further comprising:
a turning means that turns a supporting frame that supports the upper side flexible roll and the lower side flexible roll, when passing the superposed curved glass plate between the upper side flexible roll and the lower side flexible roll,
and wherein, the turning means turns the supporting frame in accordance with the passing of the superposed curved glass plate so that an imaginary line connecting rotation centers of the upper roll and the lower roll is a normal of the curved glass plate surface at a fulcrum point of the plate surface with an intersection point of the imaginary line and the superposed curved glass plate being the fulcrum then the supporting frame agrees with the imaginary line.

7. The preliminary bonding device of the laminated glass as claimed in claim 1, further comprising:
a turning means that turns a supporting frame that supports the upper rolls and the lower side flexible roll, when passing the superposed curved glass plate between the upper rolls and the lower side flexible roll,
and wherein, the turning means turns the supporting frame in accordance with the passing of the superposed curved glass plate so that an imaginary line connecting rotation centers of the upper roll and the lower roll is a normal of the curved glass plate surface at a fulcrum point of the plate surface with an intersection point of the imaginary line and the superposed curved glass plate being the fulcrum then the supporting frame agrees with the imaginary line.

\* \* \* \* \*